United States Patent [19]

Cripe

[11] 3,719,123
[45] March 6, 1973

[54] FRICTIONAL LOCK FOR DUAL RATIO PEDAL DEVICE

[75] Inventor: Maxwell L. Cripe, South Bend, Ind.

[73] Assignee: The Bendix Corporation

[22] Filed: May 27, 1971

[21] Appl. No.: 147,494

[52] U.S. Cl....................91/391, 60/54.6 R, 74/516, 74/518
[51] Int. Cl. ..........................F15b 13/10, F15b 7/00
[58] Field of Search..............60/54.6 R; 74/516, 518; 91/391

[56] References Cited

UNITED STATES PATENTS

| | | | |
|---|---|---|---|
| 3,633,366 | 1/1972 | Cripe | 60/54.6 R |
| 2,755,891 | 7/1956 | Levell et al. | 91/391 A |

*Primary Examiner*—Martin P. Schwadron
*Assistant Examiner*—A. M. Zupcic
*Attorney*—Leo H. McCormick, Jr.

[57] ABSTRACT

A brake activating mechanism for transmitting a dual ratio input force in response to an operational force needed to activate a servomotor. A lever arm pivotally attached to a support has a first and second force transmitting member pivotally located at different distances on the lever arm. The first force transmitting member is slidably attached to a valve rod which operates the servomotor. A side projection is fixed to the valve rod. The second force transmitting member has a first resilient member which surrounds a shaft which moves through the side projection as the resilient member is compressed and transmits an input force to the side projection. A second resilient member responsive to the movement of the shaft positions a locking wedge to frictionally engage the first force transmitting member with the valve rod when a predetermined operative force is required to activate the servomotor. When the first force transmitting member is frictionally engaged and combined with the second force transmitted through the first resilient member, an additive output force sufficient to activate the servomotor for energizing a master cylinder can be produced.

17 Claims, 7 Drawing Figures

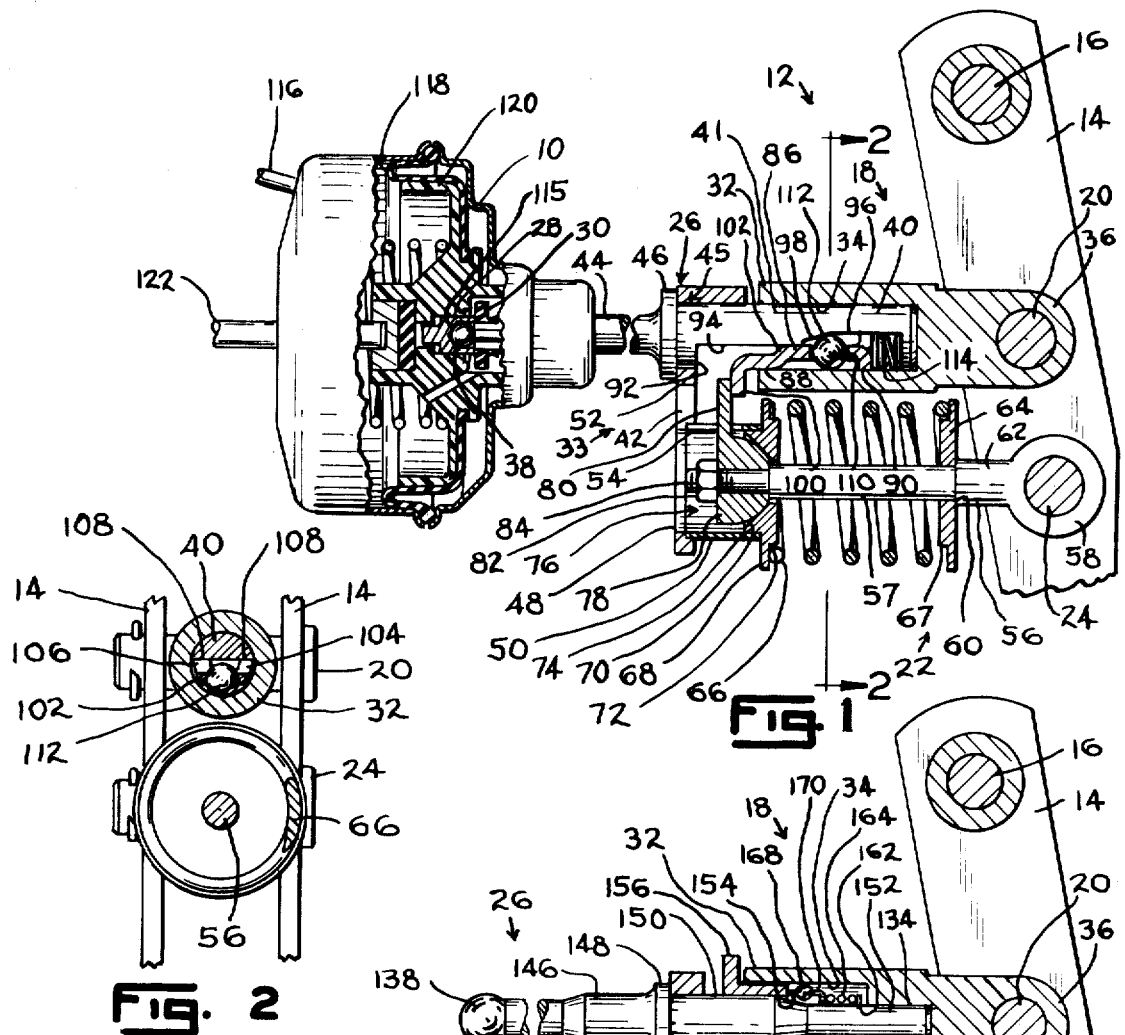
Fig. 1
Fig. 2
Fig. 4
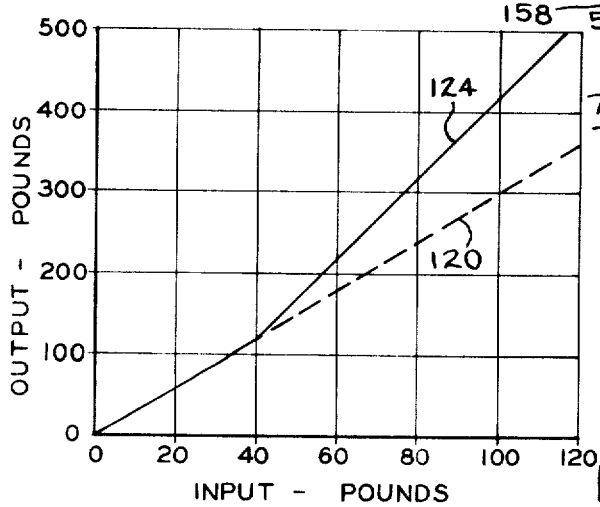
Fig. 3
INVENTOR.
MAXWELL L. CRIPE
ATTORNEY

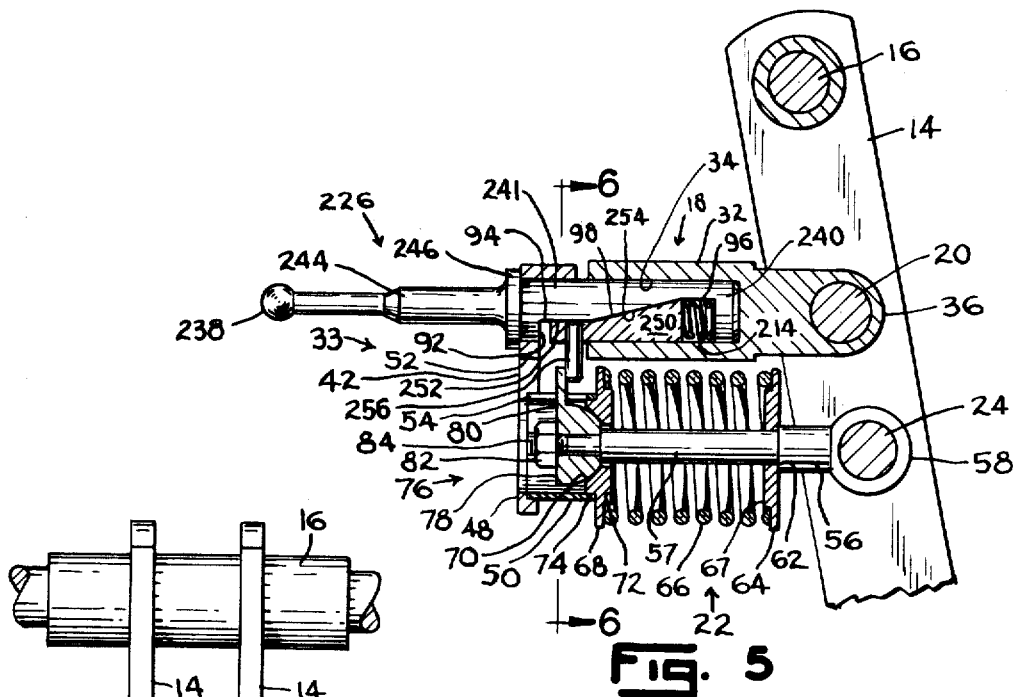
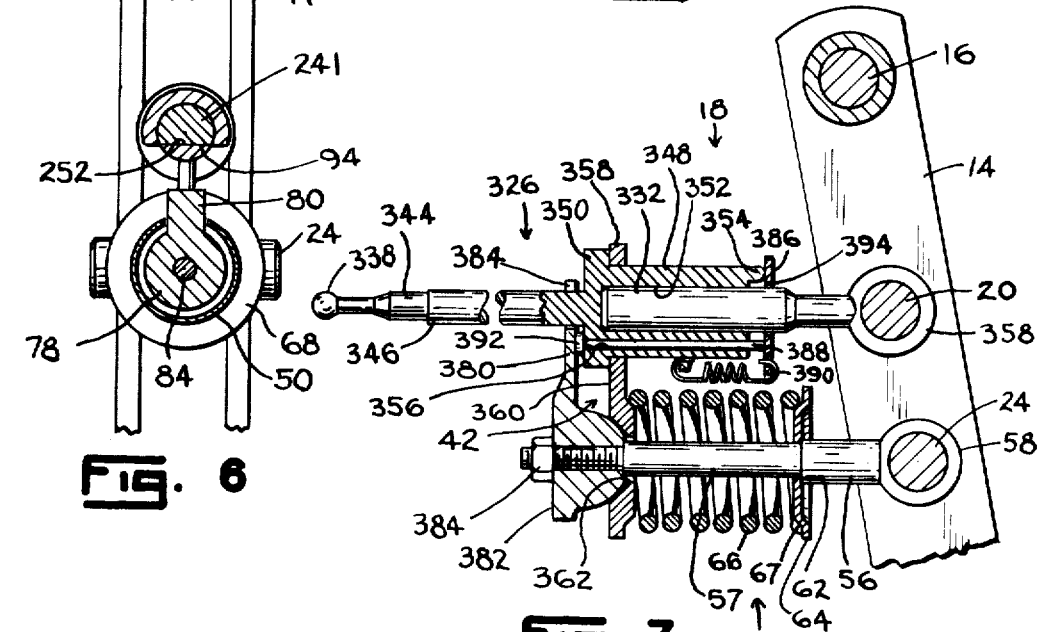

FRICTIONAL LOCK FOR DUAL RATIO PEDAL DEVICE

BACKGROUND OF THE INVENTION

In modern vehicles equipped with power operated braking systems, a servomotor supplies a greater output force in response to a lesser manual input force, said output force being utilized to apply a master cylinder. The input force is manually supplied by an operator moving a lever arm. Generally, with the vehicle engine running, the input force needed is very slight, since its primary function is to operate a control valve in the servomotor. The control valve regulates fluid flowing under pressure to the servomotor to create a pressure differential across a movable wall in the servomotor. This pressure differential provides the operational output force needed to energize the master cylinder.

However, if the fluid flow for operating the servomotor fails, the operator must manually supply the output force to energize the master cylinder.

In order to increase the effectiveness of the input force when fluid power is unavailable, various devices such as those termed "pop-up pedal" devices have been made available. In most of these devices, the location through which the input force is transmitted is shifted to provide a pedal with a different leverage transmission point. Examples of these devices can be seen in U.S. Pat. No. 3,142,199 where toggle linkage changes the leverage point, U.S. Pat. No. 3,275,891 where vacuum controlled levers change the point of application, and by a positioning slot on the pedal arm as shown in U.S. Pat. No. 3,063,427. In addition to the numerous parts that are needed to bring the pedal into the different position, if power is lost when the vehicle is moving, the pedal pops up and it takes the operator some time to adjust to this new pedal height.

In my copending U.S. application Ser. No. 23,533, filed Mar. 30, 1970 now U.S. Pat. No. 3,633,366 and incorporated by reference, a dual lever ratio input force is provided to maintain the pedal in the same physical height at all times, with and without power. In this device the first force transmitting member is separated from the valve operating the servomotor until the force required to operate the servomotor being transmitted through a resilient member is sufficient to compress the resilient member and close a gap. With the gap closed, further input is then transmitted through the first force transmitting means. However, during the period of time it takes to close the gap, the operator experiences a feeling that the input force is failing to properly operate the valve rod supplying an input to the servomotor.

SUMMARY OF THE INVENTION

In this invention I have provided means which move in response to the compressing of a resilient means of the second force transmitting member to automatically frictionally engage the first force transmitting member with the valve rod when a predetermined output force is required to operate the servomotor. The frictional engagement occurs through a wedging action between the valve rod and the first force transmitting member. Upon further input force by the operator, an additive input force made up of the force transmitted through the resilient member and the frictionally held wedge will be provided to operate the servomotor.

It is therefore the object of this invention to provide means whereby an additive output force for operating a servomotor is created under varying input forces.

It is another object of this invention to provide locking means responsive to a second force transmitting member for frictionally engaging a first force transmitting means by wedge means when a predetermined operational force is required.

These and other objects of this invention will become apparent from reading this specification and viewing the drawings.

BRIEF DESCRIPTION OF THE DRAWINGS

FIG. 1 is a sectional view of a mechanism for automatically providing an additive output force of a first and second force transmitting means to a valve rod in response to a force required to operate a servomotor;

FIG. 2 is a sectional view taken along line 2—2 of FIG. 1;

FIG. 3 is a graph showing the output force produced by a corresponding input force applied to a brake pedal;

FIG. 4 is a sectional view of another embodiment of the means for locking the first and second force transmitting means together to provide the resultant output force;

FIG. 5 is a sectional view of a further embodiment of the means for locking the first and second force transmitting means together;

FIG. 6 is a sectional view taken along line 6—6 of FIG. 5;

FIG. 7 is a sectional view of a still further embodiment of the means for locking the first and second force transmitting means together.

DETAILED DESCRIPTION OF THE PREFERRED EMBODIMENT

The mechanism for providing an additive output force, as shown in FIG. 1, for operating a servomotor 10 generally comprises brake activating means 12 having a lever arm 14 pivotally attached by pin 16 to a support bracket (not shown) of a vehicle. A first force transmitting means 18 is pivotally secured by pin 20 to lever arm 14, a first predetermined distance from pin 16 and a second force transmitting means 22 is pivotally secured to the lever arm 14 by pin 24, a second predetermined distance further away from pin 16 then the first predetermined distance. The first and second force transmitting means 18 and 22, respectively, are connected to the valve rod means 26 which operates the plunger means 28 of the control valve 30 of the servomotor 10. Initially, input force from an operator is applied to lever arm 14 through the second force transmitting means 22 until the force required to operate the plunger means 28 reaches a predetermined amount. When this predetermined output force is reached, locking means 33 frictionally wedges the first force transmitting means 18 into engagement with the valve rod means 26. Any further input force will be additively supplied to the valve rod means 26 through the combined effects of the first and second force transmitting means 26.

In more particular detail, the first force transmitting means 18 consists of a push rod 32 having an eye 36 on one end and a cylindrical bore 34 on the other end. Eye 36 is pivotally mounted on pin 20 in axial alignment with the valve rod means 26 to permit relative movement therebetween and to reduce the possibility of uncontrolled frictional drag between the cylindrical bore 34 and the valve rod means 26.

The valve operating means 26 consists of a valve rod 44 having a spherical end 38 which is self aligning in the plunger means 28 and a cylindrical end 40 which is slidably retained in cylindrical bore 34. A side projection 42 is fixed to the valve rod 44 adjacent the cylindrical bore 34 of the push rod 32.

The side projection 42 has an annular portion 45 which surrounds the valve rod 44 and is fixed to a shoulder 46. The side projection has an opening 48 with a cylindrical member 50 secured around the periphery of the opening 48. A slot 52 along the center of the side projection 42 corresponds with a slot 54 in the cylindrical member 50.

The second force transmitting means 22 has a push rod 56 with an eye 58 pivotally secured between lever arms 14 by pin 24. The push rod 57 has a smaller diameter portion 56 which forms a shoulder 60 with a larger diameter portion 62. A first support plate 64 surrounds the small diameter portion 56 and abuts shoulder 60. a resilient means 66 surrounds the smaller diameter portion 56 and is positioned on the first support plate 64 by a rib 67. A second support plate 68 which surrounds the smaller diameter portion 56 has a centrally located conical opening 70 on a front face and a rib 72 on the rear face on which the resilient means 66 is positioned. The conical opening 70 terminates into a cylindrical section 74 which mates with the interior of the cylindrical portion 50 fixed to the side projection 42. Keeper means 76 has a washer member 78 with a spherical face which matches the conical opening 70 of the second plate member. A tang or hold off means 80 on washer member 78 is movable in slots 52 and 54. Washer member 78 is fixed to the small diameter 56 by a nut 82. The smaller diameter portion 57 has a sufficient number of threads 84 to permit the nut 82 to sufficiently adjust the position of the tank 80 with respect to the locking means 33 to control the initial location for frictionally engaging the valve rod 44 with the push rod 32.

The valve rod 44 has a notched surface 92 beginning adjacent the side projection 42 and extending to cylindrical end 40. The notched surface 92 has a first planar surface 94 and a second planar surface 96 parallel to the central axis of the valve rod 44 separated by an inclined surface 98.

The locking means 33 consists of a support 86 having a first semi-cylindrical surface 88 and a second semi-cylindrical surface 90 which conforms to the shape of the cylindrical bore 34. The first semi-cylindrical surface 88 has a downward projecting end 100 which engages tang 80 of the keeper means 76. Connected to the cylindrical surface 88 is a first planar surface 102 which engages and is slidable upon the first planar surface of the valve rod. The first planar surface 102 extends to a position opposite the second cylindrical surface 90 where prongs 104 and 106 are turned upward to provide a second planar surface 108, as shown in FIG. 2, for engagement with the second planar surface 96 of the valve rod 44. The first planar surface 102 of the support 86 has an annular opening 110 perpendicular to the central axis of the valve rod 44. A spherical member 112 is located in the annular opening 110 and rolls upon the surface of the cylindrical bore 34. A resilient member 114 is located between the cylindrical end 40 of the valve rod 44 and the second cylindrical surface 90 and prongs 104 and 106 which urges the downward projection 100 of the support 86 into engagement with the tang 80.

MODE OF OPERATION OF THE PREFERRED EMBODIMENT

A slow rolling stop can normally be achieved with an input force by the operator of from 10–12 ft./lb. to the lever arm 14. This input force will cause the lever arms 14 to pivot on pin 16. Push rod 57 will move faster than push rod 32 because of its greater distance from the pivot pin 16 causing a gap 99 to develop between the cylindrical end 40 and the bottom of bore 34. Thus, this initial input force will be transmitted as an operation force through the pin 24 to push rod 57. The push rod 57 transfers the input force to resilient means 66 which acts on the second plate 68 to push on cylindrical member 50 fixed to the side projection 42 attached to the valve rod 44. The force supplied to the valve rod 44 through the resilient means 66 is directly dependent upon ratio of the distance from the pivot pin 16 to the input pedal (not shown) and pin 24 which locates the second force transmitting means 22 on the lever arms 14. For illustration purposes, this ratio is assumed to be 3:1 and as shown in FIG. 3 by line 120, 10 lbs. of force from an operator will equal 30 lbs. of force carried through resilient means 66 to move valve rod 44. Movement of valve rod 44 will be transmitted through the self-aligning end 38 retained in a conical bottom of bore 115 of the plunger means 118 to the control valve 30, in a manner fully disclosed in U.S. application Ser. No. 128,754, filed Mar. 29, 1971 incorporated herein by reference. When the control valve moves, vacuum from port 116 normally suspending the diaphragm 118 will be interrupted and atmospheric pressure permitted to the rear side of the diaphragm 118. With vacuum on the front side of the diaphragm 118 and atmospheric pressure on the rear side, a pressure differential will occur which will cause the wall means 120 to move and transmit an output force through push rod 122 for energizing the master cylinder (not shown). As shown in FIG. 3, 10 lbs. of force on the pedal by the operator equals 30 lbs. of valve rod 44 operating force which supplies the energizing force for the push rod 122.

As the force required to energize the master cylinder (not shown) increases, a corresponding input force is required. Up to 120 ft./lbs. of force can be transmitted through the resilient means 66 and directly supplied to the valve rod 44. In transmitting this input force, resilient means 66 will be compressed, permitting tang 80 to move in slot 54. Initially during the development of gap 99, resilient means 114 will move support 86 in notch 92 to keep the downward projection 100 engaged with the tang of hold off means 80. As resilient means 66 is further compressed, resilient means will move spherical member 112 into contact with the inclined surface 98. When the operating force required exceeds 120 lbs. input, tang 80 will have moved in slot 54 out of engagement with projection 100 and permits resilient means 114 to frictionally wedge spherical member 112 between the inclined surface 98 and bore 34 and terminate the development of gap 99. Further input force from the operator will now be communicated through the frictionally locked first force transmitting means 18. The force transmitted through resilient means 66 will remain constant and further force on the pedal will be transmitted through the first force transmitting means at a different mechanical ratio. For illustration purposes the pivot pin 20 of the first force transmitting means 18 is assumed to be located at a ratio of 5:1 as compared to pin 16 and the input pedal. As seen in FIG. 3, above the point where 40 lbs. of input are required, curve 124 approximates the corresponding output of the additive components of the first and second force transmitting means 18 and 22, respectively. This additive component will be approximately 4.2:1 at 100 lbs. of input force on the pedal which will produce 420 lbs. of force on valve rod 44. This additive input will be sufficient to bring a vehicle to a stop without power assist from the servomotor 10 should vacuum for operating be unavailable.

Throughout this specification in the several embodiments wherein like elements are used, reference numerals will be the same as described in FIG. 1.

In the embodiment shown in FIG. 4, the valve operating means 126 consists of a valve rod 144 having a spherical end 138 which is retained in a plunger means 28, as described with reference to FIG. 1, and a first cylindrical section 146 with a shoulder 148. A second cylindrical section 150 adjacent the shoulder 148 is separated from a third cylindrical section 152 of a smaller diameter by a conical section 154. Bore 34 in push rod 32 has a smaller diameter section 134 to slidably receive and retain the third cylindrical section 152 of the valve rod 144. A sleeve member 156 is slidably retained on the second cylindrical section 150 and free to move in bore 34. The sleeve member 156 has an annular projection 158 which engages tang 80 on keeper means 76. A snap ring 160 is retained in a groove 162 in the third cylindrical section 152 of the valve rod 144. Resilient means 164 is located between snap ring 160 and an annular support 166. A plurality of spherical members 168 are loosely retained in opening 170 in the support 166. The openings 170 are substantially perpendicular to the control axis of the valve rod 144.

Similarly as described with reference to FIG. 1, the input force is carried through the second force transmitting means 22. As the input force is carried through the second force transmitting means 22, gap 99 will be developed and increased as, resilient means 66 is correspondingly compressed with an increase in the required operational force. Upon compression of resilient means 66, shaft 56 will move in opening 70 and tang 80 will slide in slot 54. Resilient means 164 will act on support 166 to slide sleeve 156 along the second cylindrical section 150 to maintain the annular projection 158 in contact with the tang 80. When the input force required to operate the servomotor exceeds a predetermined amount, for example 40 lbs. on the pedal, the tang 80 will have moved out of contact with the sleeve 156 and resilient means 164 will frictionally wedge the plurality of spherical members between the inclined surface 154 and the bore 34 to terminate the development of gap 99 and lock the push rod 32 to the valve rod 144. Any further input from the operator will be transmitted through the first force transmitting means 18 at a different location on the lever arm 14 then the second force transmitting means 22 and combined with the force transmitted through resilient means 66 to additively provide the valve rod 144 with sufficient force to operate the servomotor.

In the embodiment shown in FIG. 5, the valve operating means 226 consists of a valve rod 244 having a spherical end 238 retained in plunger means 28 in a manner fully described in U. S. application Ser. No. 128,754, filed Mar. 29, 1971 and incorporated herein by reference, and a cylindrical section 244 with a shoulder 246 against which the side projection 42 is secured. The cylindrical section 241 between the cylindrical end 240 and shoulder 246 has a notch cut into the valve rod 244. The notch has a first planar surface 94 adjacent the side projection and a second planar surface 96 adjacent the cylindrical end 240. An inclined surface 98 connects the first and second planar surfaces. Semi-cylindrical wedge means 250 have a first planar surface 252 which matches planar surface 94, as shown in FIG. 6, and an inclined surface 254 which is matched with surface 98. A pin member 256 secured to the wedge means 250 perpendicular to the first planar surface 252 extends downward from the wedge means 250 to engage tang 80 on the second force transmitting means. Resilient means 214 is located between the wedge means 250 and cylindrical end 240 to urge pin 256 into contact with tang 80.

As described above with reference to FIGS. 2 and 4, input force from an operator is carried through the resilient means 66 of the second force transmitting means 22 to the side projection 42 to operate the valve rod 244 until the required operational force reaches a predetermined value. In reaching this predetermined value, resilient means 66 will be compressed allowing tang 80 to move away from pin 256. Upon tang 80 separating from pin 256, resilient means 214 will frictionally engage wedge means 250 between the inclined surface 98 in section 241 of the valve rod 244 and bore 34 in push rod 32. With push rod 32 and push rod 244 frictionally locked together, any further input force will be added to the force transmitted through resilient means 66 by being directly transmitted through the first force transmitting means 18. Through the combined force resulting from the input from the operator through the first and second force transmitting means 18 and 22, respectively, a servomotor can manually be operated in the event of failure in the power supply of the servomotor.

In the embodiment shown in FIG. 7, the valve operating means 326 consists of a valve rod 344 with a spherical end 338 adapted to be retained in plunger means 28 described with reference to the above incorporated U. S. application Ser. No. 128,754, a first cylindrical section 346 and a second cylindrical section 348. The first 346 and second 348 cylindrical sections are separated by an annular shoulder 350. The second cylindrical section 348 is larger in diameter than the first cylindrical section 346 and has a central cylindrical bore 352 in axial alignment with the valve rod 344. A projection 354 parallel to the bore 352 extends from the upper edge of the second cylindrical secton 348. a bore 356 parallel to bore 352 extends through the shoulder 350 and second cylindrical section 352.

The side projection means 42 consists of an annular member 358 fixed to shoulder 350 having an arm 360 substantially perpendicular to the valve rod 344. An opening 362 in the arm 360 permits the shaft 57 to slide as resilient means 66 is compressed through the input force applied through the second force transmitting means 22. Tang 380 secured to washer 382 has a forked end 384 which slides along the first cylindrical section 346 of the valve rod 344 as the resilient means 66 is compressed. Washer 382 is fixed on the small diameter portion 56 of the push rod by nut 384.

The first force transmitting means 18 consists of a cylindrical push rod 332 having an eye 358 which is pivotally retained on pivot pin 20. The cylindrical push rod 332 is axially aligned in bore 352 to be adapted to slide as lever arm 14 moves in an arc around pin 16.

An annular plate 386 loosely surrounds push rod 332 and is held against pin 388 slidably retained in bore 356 by resilient means 390. Pin 388 has a head 392 which is held in an abutting relationship with shoulder 350 by tang 380.

As described with reference to FIG. 1, the second force transmitting means 22 will transmit the input force from the operator by the lever arms 14 to develop gap 99 until the force required to operate the servomotor reaches a predetermined value. The second force transmitting means 22 carries the input force through resilient means 66 until this predetermined value is reached. As the input force transmitted through resilient means 66 increases, the resilient means correspondingly is compressed permitting push rod 56 to move through opening 362. As push rod 56 moves in opening 362, tang 380 will slide and be guided by fork 384 engaging the first cylindrical section 346. As tang 380 moves, the head 392 of pin 388 will be slidably urged against tang 380 by resilient means 390. When the predetermined force is reached, tang 380 will have separated from head 392 and the interior surface around opening 394 of plate 386 will be frictionally wedged against push rod 332 by resilient means 390 to terminate the development of gap 99.

Any further input force will be added to the force transmitted through resilient means 66 by being transmitted through the first force transmitting means 18 at a lower ratio then the second force transmitting means 22 to provide the valve operating means 326 with the force to operate the servomotor.

I claim:
1. A brake activating mechanism comprising:
   a support member;
   lever means pivotally retained on said support member, said lever means being operatively controlled by an operator;
   valve operating means having an output rod connected to a servomotor;
   first force transmitting means pivotally attached to said lever means a first fixed distance from said support and in axial alignment with said output rod of said valve operating means, said first force transmitting means being capable of communicating a first force to said valve operating means resulting from movement of said lever means by said operator;
   second force transmitting means pivotally attached to said lever means a second fixed distance from said support member further than said first force transmitting means, said second force transmitting means being capable of communicating a second force from said lever means to said valve operating means in response to initial movement thereof by the operator;
   first resilient means located between said second force transmitting means and said valve operating means for carrying a predetermined operative force to said valve operating means from said lever means;
   tang means secured to the second force transmitting means;
   locking means including wedge means operatively connected to said tang means and carried by the first force transmitting means, said wedge means being urged against said tang means by a second resilient means as the second force transmitting means is moved in opposition to said first resilient means by said predetermined operative force, said wedge means frictionally engaging said first force transmitting means with the valve operating means as the tang means is moved out of contact with the wedge means when the predetermined operative force moves said second force transmitting means in overcoming the first resilient means, said frictional engagement allowing any additional operational force to be transmitted through the first force transmitting means to provide an additive resultant output force with the operational force carried through the first resilient means to operate the valve operating means of the servomotor.

2. The brake activating mechanism, as recited in claim 1 wherein said second force transmitting means includes:
   side projecting means substantially perpendicularly fixed to said output rod of said valve operating means of said servomotor, said side projecting means having an annular bearing surface to uniformly receive and convey said second force to said valve operating means.

3. The brake activating mechanism, as recited in claim 2, wherein said second force transmitting means includes:
   a push rod member having an eye on one end, said eye being secured to a second fixed pin in said lever means, said push rod having a shoulder adjacent the eye end of the push rod member;
   a first support plate surrounding said push rod and abutting said shoulder; and
   keeper means secured to the other end of said push rod member for retaining said resilient mans between said side projection and said first support plate, said keeper means being adapted to move in a slot in said annular bearing of said side projection upon flexing of said resilient means in response to an applied force to said lever means by an operator.

4. The brake activating mechanism, as recited in claim 1, wherein said first force transmitting means includes:
   a push rod having an eye on one end, said eye being secured to a first fixed pin in said lever means and connected to said wedge means, said wedge means engaging said push rod to provide a coupling through which said additional operational force is transmitted.

5. The brake activating mechanism, as recited in claim 4, wherein said output rod of the valve operating means includes:
   a valve rod member having a spherical surface on one end, said spherical surface providing a self-aligning outlet surface through which said output force is transmitted to said servomotor;
   a housing secured to the other end of said valve rod member, said housing having an axial bore for receiving the push rod of said first force transmitting means and a parallel bore adjacent said axial bore, said housing having a projection adjacent a portion of the opening to said axial bore;
   a plate having an annular opening larger than and surrounding said push rod of said first force transmitting means;
   a stem member located in said parallel bore having a head portion connected to said tang of the keeper means, said stem member extending past the opening in the parallel bore to a distance equal to the projection adjacent the axial opening; and
   a resilient member secured to said plate and said housing for biasing said plate against said stem member;
   said resilient member moving the surface of the plate against the push rod of the first force transmitting means to provide a frictional connection as the stem member slides in the parallel bore in response to movement of said tang as said resilient means between said support plate and said keeper means is compressed through an applied force on said lever means by an operator.

6. The brake activating mechanism, as recited in claim 5, wherein said resilient means acts on said first support plate to urge said keeper means against said side projection causing said tang to move said stem member in said parallel bore to disengage the frictional connection between said plate and the push rod permitting said second force transmitting means alone to be operatively connected to said output means.

7. The brake activating mechanism, as recited in claim 4, wherein said first force transmitting means further includes:
   a cylindrical bore in the other end of said push rod.

8. The brake activating mechanism, as recited in claim 7, wherein said output rod of the valve operating means includes:
   a valve rod member having a spherical surface on one end, said spherical surface providing an outlet surface through which said output force is transmitted to said servomotor;
   said valve rod member having a notch adjacent the other end of the push rod located in said cylindrical bore, said notch having an inclined surface extending from a first plane parallel to the central axis of the valve rod member to a second plane adjacent the other end of the push rod.

9. The brake activating mechanism, as recited in claim 8, wherein said wedge means includes:
   a semi-cylindrical member located in the notch of said valve rod member having a parallel planar surface and inclined surface which are complementary to the respective corresponding surfaces of said valve rod member of said valve operating means; and
   resilient means connected to said semi-cylindrical member and said push rod for biasing the inclined surface toward each other.

10. The brake activating mechanism, as recited in claim 9, wherein said wedge means further includes:
    a pin member attached to said planar surface of the semi-cylindrical member, said tang member engaging said pin member to permit said other end of the valve rod member of the valve operating means to slide in said cylindrical bore until the input force of the operator is greater than the force required to compress said resilient means surrounding the second force transmitting push rod whereupon said tang member moves away from said pin member permitting said semi-cylindrical member to move in said notch to frictionally connect the first force transmitting means with the valve operating means.

11. The brake activating mechanism, as recited in claim 10, wherein said tang member engages said pin member upon releasing the input force acting on said resilient means to sufficiently separate the inclined surfaces of said push rod and said semi-cylindrical member permitting disengagement of said frictional connection.

12. The brake activating mechanism, as recited in claim 8, wherein said wedge means includes:
    a semi-cylindrical member located in said notch with a planar surface parallel to and slidable upon the first planar surface of the push rod, said semi-cylindrical member having a first end with a downwardly projecting surface engageable with said tang on said keeper means, said semi-cylindrical member having a second end with a rear surface which matches the semi-cylindrical surface and the second planar surface of said valve rod member, said semi-cylindrical member having an annular opening perpendicularly located to said push rod between the first and second ends;
    a spherical member located within said annular opening; and
    a resilient member acting on said rear surface for biasing said downward projection against said tang.

13. The brake activating mechanism, as recited in claim 12, wherein said tang member moves upon compression of said resilient means surrounding said second force transmitting means causing said spherical member to be frictionally engaged with said inclined plane of said notch surface causing said first force transmitting means to transmit a first force which will be combined with the second force from said second force transmitting means to provide an additive output force to operate said valve means.

14. The brake mechanism, as recited in claim 4, wherein said cylindrical bore is stepped into a first portion and a second portion, said second portion having a smaller diameter than said first portion.

15. The brake mechanism, as recited in claim 14, wherein said output rod of the valve operating means includes:
    a valve rod member having a spherical surface on one end with a first cylindrical section extending to a conical section which transitions into a second cylindrical section on the other end, said second cylindrical section being adapted to be slidably retained in said second portion of said cylindrical bore; and a sleeve member slidably located on said first cylindrical section having a peripheral flange for engaging said tang member, said sleeve member extending into said first portion of said cylindrical bore.

16. The brake mechanism, as recited in claim 15, wherein said wedge means includes:

an annular retainer member surrounding said second portion of the valve rod member with a plurality of openings radially located perpendicular to said second portion;

a plurality of spherical members retained in said radial openings; and resilient means surrounding said second portion of the valve rod member for urging said annular retainer member into abutting engagement with said sleeve member.

17. The brake mechanism, as recited in claim 16, wherein an operational force is applied to said lever means causing compression of said resilient means of said second force transmitting means and moving said keeper means, said resilient means surrounding said second portion of said valve rod member correspondingly moving said sleeve member to maintain the peripheral flange in contact with said tang member, said annular retainer member moving with said sleeve member causing said spherical member to move on said conical section until a predetermined output force is reached causing said spherical member to frictionally engage said first portion of the stepped bore with the conical section of the valve rod member, said engagement causing the input force to be additively combined through said first and second force transmitting means to operate said servomotor, said tang means upon disengagement of the operational force moving said sleeve to release said frictional engagement upon expansion of said compressed resilient means of the second force transmitting means.

* * * * *